April 17, 1928.
A. SANGUINETI
1,666,793
CONTROLLING MEANS OF VARIABLE SPEED GEARING FOR
MOTOR VEHICLES HAVING HANDLE BARS
Filed Dec. 29, 1927
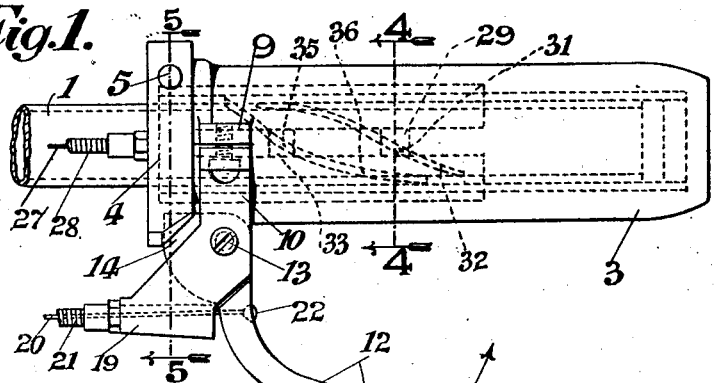
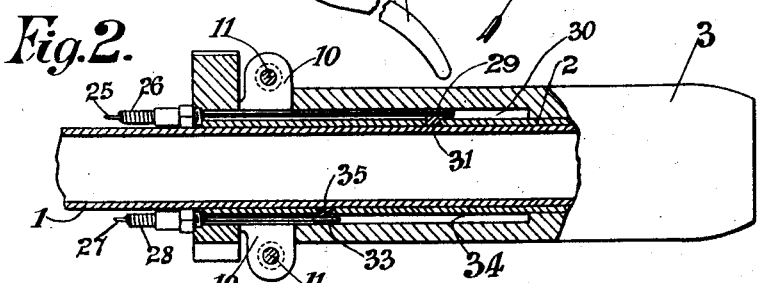
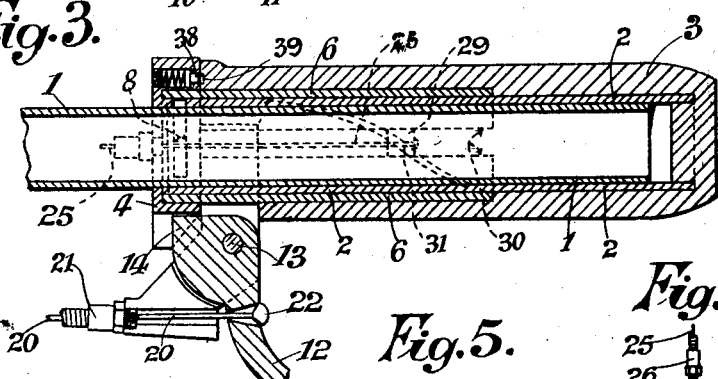
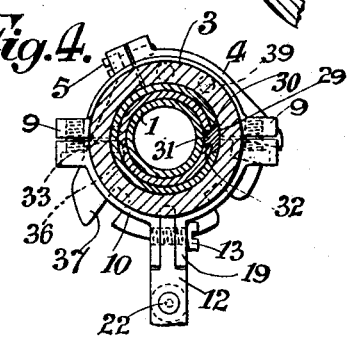
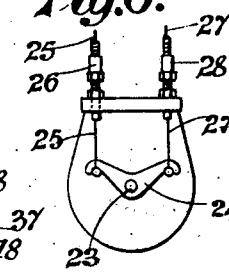
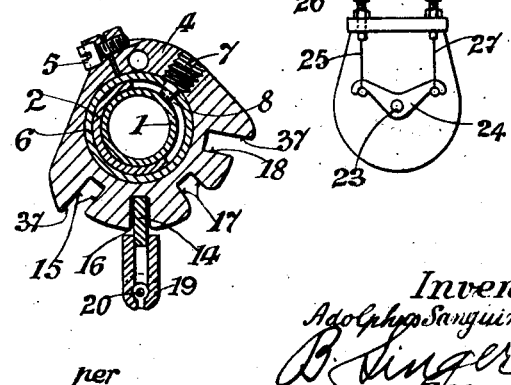
Inventor.
Adolpho Sanguineti.
B. Singer
per   Attorney.

Patented Apr. 17, 1928.

1,666,793

UNITED STATES PATENT OFFICE.

ADOLPHUS SANGUINETI, OF STOCKPORT, ENGLAND.

CONTROLLING MEANS OF VARIABLE-SPEED GEARING FOR MOTOR VEHICLES HAVING HANDLEBARS.

Application filed December 29, 1927, Serial No. 243,411, and in Great Britain September 10, 1926.

This invention relates to the controlling means of non-continuous variable speed gearing of motor vehicles having handle bars and a drive transmission clutch. The object of the said invention is to facilitate the operation of gear changing under all the operation of gear changing under all driving conditions and without having to remove the hand from the handle bars during the operation of gear changing.

Previous to my invention it has been proposed in a continuously variable speed gear having a displaceable driving member, to secure the said member in its infinite positions of adjustment by means of a holding clutch and where applied to a vehicle with handle bars, to move the displaceable driving member by means of a single tractive member of a Bowden wire operatively connected to a turnable hand grip of the handle bar, the said hand grip carrying an oscillatable lever connected by another tractive member to the said holding clutch, for the purpose of enabling with one hand the said clutch to be disengaged and the displaceable member to be adjusted while the clutch remains disengaged.

I attain this object by the mechanism shown in the accompanying drawings and hereinafter claimed. In the drawings—

Figure 1 is a detached front view of a portion of a handle bar of a motor vehicle.

Figure 2 is a plan view thereof, partly in section.

Figure 3 is a front view in section.

Figure 4 is an end view in section on line 4—4 of Figure 1.

Figure 5 is an end view in section on line 5—5 of Figure 1.

Figure 6 is a detached elevation of a gear box and is drawn to a different scale from that of the other figures.

Referring to the drawings, in the construction illustrated therein, I provide on the handle bar 1 a tube 2 rotatable on the handle bar and fixed at its outer end to the handle 3. The collar 4 is rigidly fixed to the handle bar, for example by splitting the collar and providing a set-screw 5 for drawing the split ends of the collar together.

The collar 4 has a tube 6 rigidly attached to it and forming an external bearing surface for the tube 2 and an internal surface for the handle 3.

The handle 3 is held against axial movement by means of a screw 7, which is screwed into the collar 4 and has on its inner extremity an anti-friction roller engaging an arcuate slot 8 provided in the tube 2.

The handle 3 is provided with lugs 9 to which is attached a bracket 10 by means of screws 11. The bracket 10 is provided with a hand lever 12 fulcrumed at 13 and having a nose 14 adapted to engage in any one of a plurality of slots 15, 16, 17 and 18 formed in the collar 4.

The bracket 10 is provided with a lug 19 through which the tractive member 20 of a Bowden wire 21, extends, the said tractive member being connected at 22 to the hand lever 12.

The tractive member 20 is also connected to the movable member (not shown) of the clutch of the vehicle.

From the hereinbefore given description it will be appreciated that when the hand lever 12 is in the position shown, its nose 14 by engagement with one or other of the said slots will lock the handle 3 against rotation, and that by pulling the hand lever 12 in the direction indicated by an arrow in Figure 1 the nose 14 can be disengaged from the slot and the handle 3 can then be rotated. Thus the handle 3 is only capable of rotation after the clutch has been disengaged and becomes locked by the action of allowing the clutch to become re-engaged.

The selector shaft 23, Figure 6 is provided with a two-armed lever 24 which oscillates with the shaft 23. One arm of the lever 24 has the tractive member 25 of a Bowden wire 26 attached to it and the other arm has the tractive member 27 of a Bowden wire 28 attached to it.

The Bowden wires 26 and 28 lead to the collar 4 and the tractive members 25 and 27 pass through holes in the said collar.

Any suitable mechanism is provided for causing the tractive members 25 and 27 to be pulled by rotation of the handle 3, the arrangement being such that on rotation of the handle in one direction, the tractive member 25 is pulled and the pull on the tractive member 27 is relieved, whilst rotation of the handle in the other direction causes the tractive member 27 to be pulled and relieves the pull on the tractive member 25.

For the purpose of explanation the following arrangement is illustrated in the drawings, but I desire it to be understood that I do not consider the means shown for actuating the Bowden members 25 and 27 novel per se.

The tractive member 25 is attached to a block 29 which slides in a straight slot 30 provided in the tube 6 and has a slanting tooth 31 which engages a slanting or helical slot 32 provided in the tube 2, which as previously indicated rotates with the handle 3. The tractive member 27 is attached to a block 33 which slides in a straight slot 34 in the tube 6 and has a slanting tooth 35 which engages a slanting or helical slot 36 in the tube 2. The slot 32 is preferably displaced axially relative to the slot 36, the tractive member 25 being of a corresponding greater length than the tractive member 27. The slots 32 and 36 are of opposite hand and when the handle 3 is turned, the blocks 31 and 33 will be therefore caused by the said slots to travel in opposite directions in the slots 30 and 34. The lever 24, Figure 6, is thus caused to oscillate a distance which corresponds with the angular movement of the handle 3. Therefore the position of the handle 3 determined by the slot 15, 16, 17 or 18 produces a corresponding angular position of the lever 24. These positions agree with the gear engaging and neutral positions of the gear box.

In the construction shown, the slot 16 agrees with the neutral position, the slot 15 with the first gear position, the slot 17 with the second gear position and the slot 18 with the third or high gear position. It will be appreciated that for a two speed gear box, only three slots are necessary and that further slots may be added in cases where the gear box provides for more than three changes.

In operation, assuming the parts to be in the position shown and the vehicle at rest, when it is desired to start, the hand lever 12 is pulled to disengage the clutch. The disengaging movement of the lever 12 unlocks the handle 3 which can be now turned until the nose 14 lies opposite the slot 15 and the first gear has thus been engaged. The lever 12 is now released and the clutch is thereby engaged. The nose 14 enters the slot 15 and thereby locks the handle against further rotation. To change up into second gear, the lever is again pulled to disengage the clutch and also disengage the nose 14 from the slot 15 and the handle is rotated whilst retaining a grip on the lever 12 until the nose 14 registers with the slot 17, whereupon engagement of the nose 14 with the last named slot locks the handle in the second gear position and engages the clutch.

The change from second to third or high gear is effected in a similar manner.

In order to limit the movement of the handles between its two extreme positions, shoulders 37 may be provided on the collar 4 to act on the nose 14 in the clutch withdrawing position of the lever 12.

Furthermore, to assist in finding the second gear position or neutral position the edges of the slot 17 or 16 may be rounded off for the purpose of guiding the nose thereinto when the grip on the lever 12 is slightly released after the nose has been completely withdrawn from any of the slots.

In addition to the rounded corners or in lieu thereof I may provide in the collar 4 a spring plunger 38 having a chisel shaped nose adapted to engage one or more correspondingly shaped cavities 39 in the inner end of the handle 3 and thereby yieldingly check the movement of the handle when the nose 14 moves into register with the slot 17 or slot 16.

I claim—

1. A controlling means for non-continuous variable speed gearing of motor vehicles having handle bars and a drive transmission clutch, comprising a turnable handle provided on the handle bar, an oscillatable transmission clutch lever mounted on the said handle, relatively stationary stop means mounted on the handle bar and adapted to co-operate with the transmission clutch lever to lock the handle against rotation when the transmission clutch lever is in its normal position, a pair of tractive members connected to the selector rod or its equivalent of the gear box to operate the selector rod or its equivalent in both directions, and means for simultaneously moving the said members in opposite directions by a turning movement of the said handle.

2. A controlling means according to claim 1, wherein the turnable handle constitutes one of the hand grips of the handle bar and has attached to it a bracket carrying the transmission clutch lever, the said lever being provided with an engaging member and the said stop member of the handle being provided with a plurality of slots positioned to coincide with the gear engagement and neutral positions of the gear box elements, said slots being each engageable by said lever member.

3. A controlling means according to claim 1, wherein a lever is provided on the selector rod or the equivalent of the gear box and is operated by a pair of Bowden wires moving in opposite directions and actuated by rotation of the said handle.

4. Controlling means of the class described comprising a handle bar, a turnable handle thereon, a bracket on said handle, a transmission clutch member pivotally connected to said bracket and provided with an engaging member, relatively stationary stop means on the handle bar having slots for engagement by said engaging member of the clutch lever and provided with rounded corners.

5. A controlling means according to claim 1, wherein stop means is provided to determine the extreme limits of movement of the handle.

In testimony whereof, I have signed my name to this specification at Caracas, Venezuela, South America, this 2nd day of December 1927.

ADOLPHUS SANGUINETI.